United States Patent [19]

Messner et al.

[11] Patent Number: 5,403,883
[45] Date of Patent: Apr. 4, 1995

[54] WATER SOLUBLE POLYMER DISPERSIONS

[75] Inventors: Bernfried Messner; Peter Quis; Guenter Schmitt; Gabriele Silva, all of Darmstadt; Manfred Braum, Mainz-Gonsenheim, all of Germany

[73] Assignee: Roehm Gmbh Chemische Fabrik, Darmstadt, Germany

[21] Appl. No.: 59,966

[22] Filed: May 13, 1993

[30] Foreign Application Priority Data

May 18, 1992 [DE] Germany .................. 42 16 167.3

[51] Int. Cl.⁶ ........................................... C08L 13/02
[52] U.S. Cl. .................. 524/458; 524/815; 524/827; 524/829; 524/831
[58] Field of Search ............ 524/458, 460, 553, 555, 524/558, 560, 815, 827, 828, 829, 831

[56] References Cited

U.S. PATENT DOCUMENTS

| | | | |
|---|---|---|---|
| 4,432,881 | 2/1984 | Evani | 524/555 |
| 4,861,499 | 8/1989 | Neff et al. | 524/555 |

FOREIGN PATENT DOCUMENTS 0271077 6/1988 European Pat. Off. .
2924663 12/1979 Germany .
59-108074 6/1984 Japan .

*Primary Examiner*—Joseph L. Schofer
*Assistant Examiner*—Jeffrey T. Smith
*Attorney, Agent, or Firm*—Oblon, Spivak, McClelland, Maier & Neustadt

[57] ABSTRACT

The invention relates to aqueous dispersions of water soluble polymers, formed by polymerization of a mixture A of various monomer components (a1, a2, and possibly a3) in the presence of a polymeric dispersant D; wherewith the mixture A is comprised of the following different monomer a1 (in the amount of 99–70 wt. %), comprised of at least one water soluble monomer, a2 (in the amount of 1–30 wt. %), comprised of at least one hydrophobic monomer, and (possibly)

a3 (in the amount of 0–20 wt. %), comprised of at least one amphipathic monomer, wherewith in each instance the sum of the amounts of a1, a2, and a3 is 100%;

and wherewith the water soluble polymers have a mean molecular weight $M_w$ (gravimetric mean) of at least $10^6$ Dalton.

11 Claims, No Drawings

WATER SOLUBLE POLYMER DISPERSIONS

BACKGROUND OF THE INVENTION

1. Field of the Invention

The invention relates to a water soluble polymer dispersion comprised of at least one water soluble monomer, at least one hydrophobic monomer, and optionally at least one amphipathic monomer, as monomer components.

2. Discussion of the Background

Aqueous dispersions of water soluble polymers are employed, e.g. as flocculants in waste water treatment, as dewatering agents when removing an aqueous phase, as retention agents in paper manufacturing, as soil conditioners, or as dispersants.

EP 170,394 describes a water-miscible liquid comprised of particles which are comprised of a high molecular weight polymer gel, with particle sizes >20 μm, in aqueous solution. The continuous phase is an aqueous solution containing an equilibrating agent which maintains the water content of the gel particles in equilibrium with the water content in the continuous phase, thereby preventing agglomeration of the gel particles. Preferred equilibrating agents are the sodium salt of polyacrylic acid, or polydiallyl dimethylammonium chloride (poly—DADMAC).

In EP 183,466, a method of manufacturing a water soluble polymer dispersion is described, characterized by polymerization of a water soluble monomer under stirring in an aqueous solution of at least one salt in the presence of a dispersing agent. Employed are polyols, polyalkylene ethers, alkali salts of polyacrylic acid, and alkali salts of poly-2-acrylamido-2-methylpropanesulfonic acid, as dispersants or as salts which do not solvate the polymer in aqueous solution.

DE 2,924,663 concerns a method of manufacturing an aqueous dispersion from a water soluble polymer composition with good stability and flowability, wherein the water soluble polymer contains at least one water soluble ethylenically unsaturated monomer, and certain substances which may be present as dispersants, e.g. polyalkylene ethers, polyethyleneimine, etc., possibly in the presence of inorganic salts. The aqueous dispersion thus produced may be used as a flocculant, thickener, soil conditioner, or for other applications, possibly after dilution with water.

In JP 59-108,074, thickeners are described which are comprised of polymers in aqueous solution, having monomer units of (meth)acrylic acid and/or salts of same, and (meth)acrylamide, and methyl- or ethyl acrylate; polyethylene glycol is employed as a dispersant.

A drawback of the gel-particle-containing aqueous solutions described in EP 170,394 is that their viscosities increase sharply upon long standing; and shear gradients (e.g. by stirring) are needed to reduce the viscosity. The properties of the liquid depends on a complex equilibrium between the polymer, the equilibrating agent, the water content, and the particle size of the gel particles.

EP 183,466 reports water soluble polymers as dispersions in aqueous salt solutions, achieved with the aid of a dispersant. A drawback of such dispersions is the high salt content of the aqueous phase (up to 30 wt. %) as compared with a relatively low polymer content (the polymer being the effective component) (up to 20 wt. %); in certain applications of such dispersions this results in waste water problems.

Aqueous dispersions according to DE 2,924,663 have the drawback of high proportions of dispersant compared to the amount of water soluble polymer. If such dispersions are employed, e.g., as flocculants for electrically charged particles, the effectiveness of the high molecular weight ionic polymer is reduced by the presence of the dispersant, which has a relatively low molecular weight compared to that of said ionic polymer.

The polymers with thickening action produced according to JP 59-108,075 have mean molecular weights ($M_w$, gravimetric mean) between c. 100,000 and 500,000 Dalton, which is clearly too low for use as flocculants.

Accordingly, the state of the art presented above leads to the problem of devising aqueous dispersions of water soluble polymers which have low viscosity, a high content of the polymeric active component, high molecular weight of said polymer, and a salt-free aqueous phase.

SUMMARY OF THE INVENTION

It was discovered that this problem is solved by aqueous dispersions of water soluble polymers formed by polymerization of a mixture A of various monomer components (a1, a2, and possibly a3), in the presence of a polymeric dispersant D; wherein a1 represents at least one water soluble monomer, present in the amount of 99–70 wt. %;

a2 represents at least one hydrophobic monomer, present in the amount of 1–30 wt. %; and a3 represents at least one amphipathic monomer, present in the amount of 0–20 wt. %; and the water soluble polymers have a mean molecular weight (gravimetric mean) of at least $10^6$ Dalton.

In preferred embodiments of the invention at least one of the water soluble monomers a1 has at least one ionic group, and the hydrophobic monomer a2 is a compound of formula I:

$$CH_2=\underset{\underset{R_1}{|}}{C}-R_2 \qquad (I)$$

where $R_1$ represents hydrogen or methyl;

$R_2$ represents a $C_{1-4}$ alkyl group, a $C_{5-12}$ cycloalkyl group, a $C_{6-12}$ aryl group or

where $R_3$ represents a $C_{2-8}$ alkyl group, and

Z represents O, NH, or $NR_3$.

The aryl group may be particularly a phenyl or naphthyl group having $C_{1-4}$ alkyl groups as substituents.

The amphipathic monomer a3 is preferably, a compound of formula II:

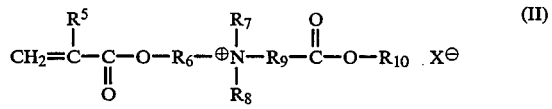

where $R_5$ represents hydrogen or methyl;

$R_6$ represents a $C_{1-6}$ alkylene group;

$R_7$ and $R_8$ each independently represent a $C_{1-6}$ alkyl group;

$R_9$ represents a $C_{1-6}$ alkylene group;

$R_{10}$ represents a $C_{8-32}$ alkyl group; and

X represents halogen, pseudohalogen, $SO_4CH_3$, or acetate; or a3 is a compound of formula III:

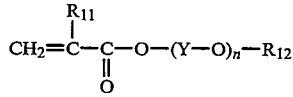

where $R_{11}$ represents hydrogen or methyl;

$R_{12}$ represents a $C_{8-32}$ alkyl group;

Y represents a $C_{2-6}$ alkylene group; and n is an integer between 1 and 50.

The preferred polymeric dispersants are polyelectrolytes which are incompatible with the dispersed polymer and have mean molecular weights (gravimetric mean) $M_w < 500,000$ Dalton, or polyalkylene ethers.

Another embodiment of the invention is to provide a method of flocculating an aqueous solution containing electrically charged particles.

Another embodiment of the invention provides a method of dewatering.

DETAILED DESCRIPTION OF PREFERRED EMBODIMENTS

The monomers a1, a2, and a3:

As monomers a1, examples of substances which may be used are salts of acrylic and/or methacrylic acid (hereinafter "salts of (meth)acrylic acid"), of general formula IV:

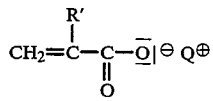

where R' represents hydrogen or methyl; and

Q represents alkali metal ions, e.g. $Na^+$ or $K^+$ or ammonium ions, e.g. $NH_4^+$, $^+N(R'')_2H_2$, $^+N(R'')_3H$, or $^+N(R'')_4$, where R'' represents a $C_{1-6}$ alkyl group, or else Q represents other monovalent positively charged ions.

Examples of monomers a1 of formula IV are sodium (meth)acrylate, potassium (meth)acrylate, and ammonium (meth)acrylate.

Also the monomer component a1 may comprise, e.g., (meth)acrylic acid itself, or a (meth)acrylamide of formula V:

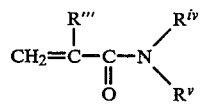

where R''' represents hydrogen or methyl; and $R^{iv}$ and $R^v$ each independently represent hydrogen, a $C_{1-5}$ alkyl group, or a $C_{1-5}$ hydroxyalkyl group.

Examples of monomers a1 of formula V which might be mentioned are: (meth)acrylamide, N-methyl (meth)acrylamide, N,N-dimethyl (meth)acrylamide, N,N-diethyl (meth)acrylamide, N-methyl-N-ethyl (meth)acrylamide, and N-hydroxyethyl (meth)acrylamide.

Also as monomer components a1 one may use monomers of formula VI:

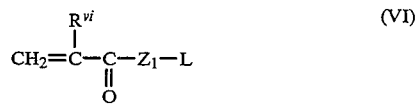

where $R^{vi}$ represents hydrogen or methyl;

$Z_1$ represents =, O, NH, or $NR_4$; and

L represents

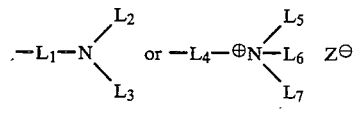

where $L_1$ and $L_4$ represent a $C_{2-6}$ alkylene group or $C_{2-6}$ hydroxyalkylene group, $L_2$, $L_3$, $L_5$, $L_6$, and $L_7$ represent a $C_{1-6}$ alkyl group, and Z represents halide, acetate, or $SO_4CH_3$.

Examples of monomers a1 of formula VI which might be mentioned are: 2-(N,N-dimethylamino)ethyl (meth)acrylate, 3-(N,N-dimethylaminopropyl) (meth)acrylate, 4-(N,N-dimethylaminobutyl) (meth)acrylate, 2-(N,N-diethylamino)ethyl (meth)acrylate, 2-hydroxy-3-(N,N-dimethylaminopropyl) (meth)acrylate, 2-(N,N,N-trimethylammonium)ethyl (meth)acrylate chloride, 3-(N,N,N-trimethylammonium)propyl (meth)acrylate chloride, and 2-hydroxy-3-(N,N,N-trimethylammonium)propyl (meth)acrylate chloride; and the corresponding (meth)acrylamides, such as 2-N',N'-dimethylamino)ethyl (meth)acrylamide, 3-(N',N'-dimethylaminopropyl) (meth)acrylamide, and 3-(N',N',N'-trimethylammonium)propyl (meth)acrylamide chloride.

Other examples of monomer components a1 are ethylenically unsaturated monomers suitable as monomer units in water soluble polymers, e.g., vinylpyridine, N-vinylpyrrolidone, styrenesulfonic acid, N-vinylimidazole, and diallyldimethylammonium chloride. Combinations of various of the above-described water soluble monomers a1 may also be used.

The water soluble monomers a1 may be readily prepared by known or conventional methods. For example, acrylic esters may be prepared by the method disclosed in Kirk-Othmer, Encyclopedia of Chemical Technology, 3rd Ed., Vol. 1, p. 330–354 (1978) while methacrylic esters may be prepared by the method of Kirk-Othmer, Encyclopedia of Chemical Technology, 3rd ed. Vol. 15, p. 346–376 (1981). (Meth)acrylamides may be prepared by the method of Kirk-Othmer, Encyclopedia of Chemical Technology, 3rd Ed. Vol. 15, p. 346–376 (1981).

The hydrophobic monomers a2 may be, e.g., monomers of formula I:

where $R_1$ represents hydrogen or a $C_{1-4}$ alkyl group; and $R_2$ represents a $C_{1-4}$ alkyl group, a $C_{5-12}$ cycloalkyl group, a $C_{6-12}$ aryl group, or $$-\underset{\underset{O}{\|}}{C}-Z-R_3$$

where $R_3$ represents a $C_{2-8}$ alkyl group, a $C_{5-12}$ cycloalkyl group, or a $C_{6-12}$ aryl group, and Z represents O, NH, or $NR_3$.

Specific examples are: styrene, α-methylstyrene, p-methylstyrene, p-vinyltoluene, vinylcyclopentane, vinylcyclohexane, vinylcyclooctane, isobutene, 2-methyl-1-butene, 1-hexene, 2-methyl-1-hexene, 2-propyl-1-hexene, ethyl (meth)acrylate, propyl (meth)acrylate, isopropyl (meth)acrylate, butyl (meth)acrylate, isobutyl (meth)acrylate, pentyl (meth)acrylate, hexyl (meth)acrylate, heptyl (meth)acrylate, octyl (meth)acrylate, cyclopentyl (meth)acrylate, cyclohexyl (meth)acrylate, 3,3,5-trimethylcyclohexyl (meth)acrylate, cyclooctyl (meth)acrylate, phenyl (meth)acrylate, 4-methylphenyl (meth)acrylate, and 4-methoxyphenyl (meth)acrylate.

Additional examples of possible hydrophobic monomers a2 are: ethylene, vinylidene chloride (1,1-dichloroethene), vinylidene fluoride, vinyl chloride, or other primarily (ar)aliphatic compounds with polymerizable double bonds. Combinations of various of the above-described hydrophobic monomers a2 may also be used.

The hydrophobic monomers a2 may be prepared by known or conventional methods.

The amphipathic monomers a3 may be, e.g., monomeric compounds of formula II or III:

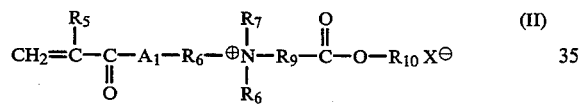

(II)

where $A_1$ represents O, NH, or $NR_4$,
where $R_4$ represents a $C_{1-4}$ alkyl group;
  $R_5$ represents hydrogen or methyl;
  $R_6$ represents a $C_{1-6}$ alkylene group;
  $R_7$ and $R_8$ each independently represent a $C_{1-6}$ alkyl group;
  $R_9$ represents a $C_{1-6}$ alkylene group;
  $R_{10}$ represents a $C_{8-32}$ alkyl, $C_{8-32}$ aryl, or $C_{8-32}$ aralkyl group; and
  X represents halogen, pseudohalogen, $SO_4CH_3$, or acetate; or

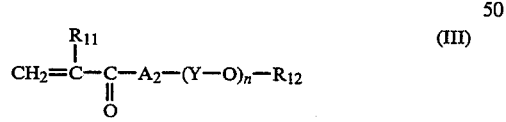

(III)

where $A_2$ represents O, NH, or $NR_{13}$, where $R_{13}$ represents a $C_{1-4}$ alkyl group;
  $R_{11}$ represents hydrogen or methyl;
  $R_{12}$ represents a $C_{8-32}$ alkyl, $C_{8-32}$ aryl, and/or $C_{8-32}$ aralkyl group;
  Y represents a $C_{2-6}$ alkylene group; and
  n is an integer between 1 and 50.

Amphipathic monomers according to their invention refers to monomers with both hydrophobic and hydrophilic units.

The term pseudohalogen as defined above refers to anions selected from the group of $CN^\ominus$, $OCN^\ominus$, and $SCN^\ominus$.

Examples which might be mentioned are:

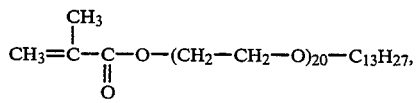

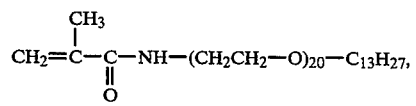

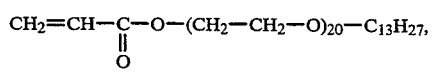

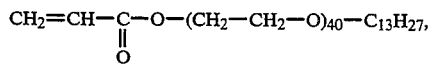

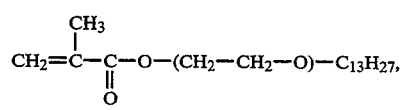

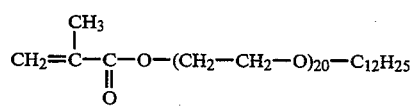

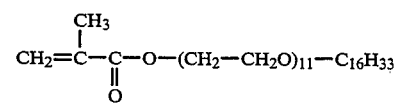

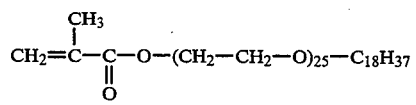

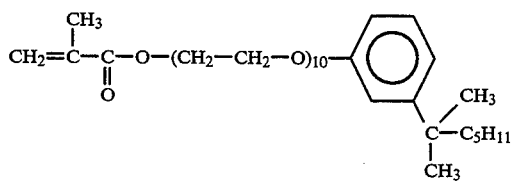

Also, the amphipathic monomers a3 may be, e.g.,

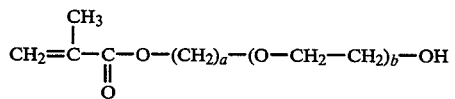

where a=6–15, and b 1=50;

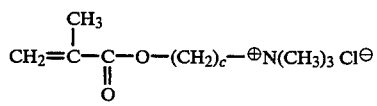

where c=6–18;

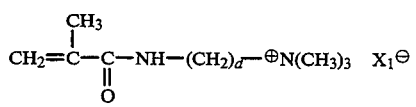

where $X_1^\ominus$ represents $Cl^-$ or $SO_4CH_3^-$, and d6=18;

or

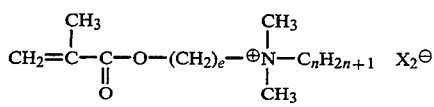

where
e=2-6,
n=6-18, and
$X_2^\ominus$ represents $Cl^-$ or $SO_4CH_3^-$.

Combinations of various above-described amphipathic monomers a3 may also be used.

The amphipathic monomers a3 may be prepared by known or conventional methods. For example, (Meth-)acrylammonium salts may be prepared by the method of Kirk-Othmer, Encyclopedia of Chemical Technology, 3rd Ed. Vol. 15, p. 346-376 (1981).

The polymeric dispersant, D:

The polymeric dispersant differs significantly in chemical composition and (gravimetric) mean molecular weight $M_w$ from the water soluble polymer comprised of the monomer mixture A, wherewith the polymeric dispersant D is incompatible with the water soluble polymer. That is the polymeric dispersant and the water soluble polymer do not form a miscible mixture when both polymers are combined in the pure state. The mean molecular weights $M_w$ of the polymeric dispersants are in the range 1000-500,000 Dalton, preferably 10,000-400,000 Dalton. (For the determination of $M_w$, see Mark, H. F., et al., 1987, "Encyclopedia of Polymer Science and Technology", Vol. 10, pub. J. Wiley, pp. 1-19).

The polymeric dispersants D contain at least one functional group chosen from the groups ether, hydroxyl, carboxyl, sulfone, sulfate ester, amino, imino, tert-amino, and quaternary ammonium. Examples of polymers D which might he mentioned are: cellulose derivatives, polyethylene glycol, polypropylene glycol, copolymers of ethylene glycol and propylene glycol, polyvinyl acetate, polyvinyl alcohol, starch and starch derivatives, dextran, polyvinyl pyrrolidone, polyvinyl pyridine, polyethyleneimine, polyvinylimidazole, polyvinylsuccinimide, polyvinylmethylsuccinimide, polyvinyl-1,3-oxazolidine-2-one, polyvinyl-2-methylimidazoline; and copolymers which may contain monomer units of one or more of the abovementioned polymers as well as, e.g., any of the following monomer units: maleic acid, maleic anhydride, fumaric acid, itaconic acid, itaconic anhydride, (meth)acrylic acid, salts of (meth)acrylic acid, and (meth)acrylamide compounds. Preferred polymeric dispersants D are polyalkylene ethers, e.g. polyethylene glycol, polypropylene glycol, or poly-1,4-butylene ether.

Particularly preferred as polymeric dispersants D are polyelectrolytes, e.g. polymers containing monomer units such as, e.g., salts of (meth)acrylic acid as anionic monomer units; or methyl-chloride-quaternized derivatives of:
N,N-dimethylaminoethyl (meth)acrylate,
N,N-dimethylaminopropyl (meth)acrylate, or
N,N-dimethylaminohydroxypropyl (meth)acrylate; or
N,N-dimethylaminopropyl (meth)acrylamide.

Most preferred as a polymeric dispersant is poly(diallyldimethylammonium chloride) (poly-DADMAC) with mean molecular weight $M_w$ between 50,000 and 400,000 Dalton.

The polymeric dispersants D may be obtained by known or conventional methods. The polyelectrolytes may be prepared by the method of Kirk-Othmer, Encyclopedia of Chemical Technology, 3rd ed., Vol. 18, p. 495-530 (1982). The polyalkylene oxide dispersants may be prepared by the method of Kirk-Othmer Encyclopedia of Chemical Technology, 3rd ed., V. 18 p. 616-670 (1982).

It should be noted that the dispersed polymer and the dispersant do not have opposite electrical charges.

Low molecular weight emulsifiers with a molecular weight <1000 Dalton may also be employed, in amounts of 0-5 wt. % based on the total weight of the polymer dispersion.

Manufacture and properties of the water soluble polymer from the monomer mixture A, in aqueous solution:

The monomer mixture A contains 99-70 wt. %, preferably 95-80 wt. % of water soluble monomers a1; 1-30 wt. %, preferably 5-20 wt. % of hydrophobic monomers a2; and 0-20 wt. % of amphipathic monomers a3, wherein the sum of the amounts of a1, a2 and a3 is 100%.

The amount of monomer mixture A per 100 parts by weight (pbw) water as a reaction medium is between 5 and 80 pbw, preferably between 10 and 50 pbw. If the monomers a1 (and possibly a3) are employed in the form of aqueous solutions, the water component of such solutions is added to the reaction medium. The amount of polymeric dispersant D per 100 pbw water as a reaction medium is between 1 and 50 pbw, preferably between 5 and 40 pbw.

To start the polymerization, means such as, e.g., radical initiators or high energy radiation (e.g. UV light) are employed. Examples of preferred radical initiators are: 2,2'-azobis(isobutyronitrile) and 2,2'-azobis(2-amidopropane)dihydrochloride, preferably dissolved in dimethylformamide; potassium persulfate, ammonium persulfate, or hydrogen peroxide, possibly in combination with a reducing agent such as, e.g., an amine or sodium sulfite. The amount of initiator based on the amount of the monomer mixture A is ordinarily between $10^{-5}$ and 5 wt. %, preferably between $10^{-4}$ and 1 wt. %, wherein at the beginning of the polymerization all of the initiator may be added, or alternatively part of it is added and the remainder is added portionwise over the entire course of the polymerization. Also all of the monomer mixture A may be added at the beginning or it may be fed over the entire course of the polymerization. The polymerization temperature is between 0° and 100° C., preferably between 40° and 55° C. Preferably the polymerization is carried out under an inert gas atmosphere, e.g. nitrogen. The final conversion of the monomer mixture A in the polymerization is >97 wt. %. In general the polymerization requires between 1 and 8 hr.

The resulting dispersion of water soluble polymer has a mean particle size of $\leq 100$ μm.

Advantageous effects of the invention:

One of the advantages of the inventive aqueous polymer dispersions is, for a given polymer concentration and a given mean molecular weight $M_w$ of the polymer, a surprisingly low viscosity is observed in comparison to polymer dispersions comprised of polymers not containing hydrophobic monomer units a2. If amphipathic monomer units a3 are incorporated into the polymer structure the viscosity of the aqueous polymer dispersion can be further reduced. This greatly improves the handleability of aqueous polymer dispersions with a high polymer content (and thereby a high content of active substance).

As the aqueous polymer dispersion is increasingly diluted with water the present viscosity rises to a very high maximum value, at which point the system becomes clear. Under these conditions, the thickening action of the dispersed polymer is pronounced. The viscosity at a polymer content of 1%, and the flocculation index ("KSD", kaolin sedimentation—see infra) of the aqueous polymer solution, are very high, wherewith the preferred dispersant D, viz. poly-DADMAC, acts simultaneously as an active material (i.e. as a means of collecting contaminants in recirculated water) and as a means of assisting floc formation, e.g. in sewage sludge clarifiers. The absence of organic solvents ensures safe handling (no flammability), and the use of the inventive polymer dispersions as thickeners, flocculent aids for electrically charged floating or suspended particles, retention agents for paper manufacturing, and/or soil conditioners, is ecologically benign. In isolated or low-water content form, the inventive polymer may be used as a dewatering agent, e.g. in the health sector.

The aqueous polymer dispersion according to the present invention is also characterized by having a salt-free aqueous phase.

Having generally described this invention, a further understanding can be obtained by reference to certain specific examples which are provided herein for purposes of illustration only and are not intended to be limiting unless otherwise specified.

EXAMPLES

The physical data were determined with reference to the following standards:

Dynamic viscosity $\eta$ (mPa-sec): according to DIN 53 018 and 53 019.

Flocculation index KSD (sec): kaolin sedimentation, according to this firm's method.

Molecular weight $M_w$: by gel permeation chromatography (GPC), with the standard being poly(2-trimethylammoniumethyl acrylate chloride).

Example 1

428.6 g of a 35% aqueous solution of poly-DADMAC, 60 g acrylamide, 93.8 g of an 80% aqueous solution of 2-trimethylammoniumethyl acrylate chloride, 15 g ethyl acrylate, and 402.6 g water were charged to a reaction vessel, degassed with $N_2$, and heated to 53° C. under stirring.

Then 0.15 g azobis(isobutyronitrile) (AIBN) dissolved in 1.36 g dimethylformamide (DMF) was added. After 3 hr under stirring the temperature was increased to 65° C. and an additional 0.15 g AIBN dissolved in 1.35 g DMF was added.

The polymerization was terminated after 1 hr additional. The dynamic viscosity of the aqueous polymer dispersion was $\eta_1 = 73,500$ mpa-sec.

The dynamic viscosity of a 1% aqueous solution of the polymer was $\eta_2 = 992$ mpa-sec.

The flocculation indices (q.v. supra) were:
$KSD_1 = 10.6$ sec;
$KSD_2 = 12.9$ sec.

The molecular weight Mw of the polymer was $> 10^6$ Dalton.

Example 2

371.5 g of a 35% aqueous solution of poly-DADMAC, 52 g acrylamide, 81.3 g of an 80% aqueous solution of 2-trimethylammoniumethyl acrylate chloride, 13 g ethyl acrylate, and 482.2 g water were polymerized by the method of Example 1.

The dynamic viscosity of the aqueous dispersion according to Example 2 was $\eta_1 = 16,000$ mpa-sec.

The dynamic viscosity of a 1% aqueous solution of the polymer was $\eta_2 = 882$ mPa-sec.

The flocculation indices were:
$KSD_1 = 12.5$ sec;
$KSD_2 = 16.4$ sec.

Example 3

428.6 g of a 35% aqueous solution of poly-DADMAC, 57 g acrylamide, 93.8 g of an 80% aqueous solution of 2-trimethylammonium acrylate chloride, 15 g ethyl acrylate, 3 g of the methacrylate ester of an alkyl polyethylene oxide with 20 ethylene oxide units and a terminal $C_{13}H_{27}$ group, and 402.6 g water were polymerized by the method of Example 1.

The dynamic viscosity of the aqueous polymer dispersion was $\eta_1 = 32,900$ mPa-sec.

The dynamic viscosity of a 1% aqueous solution of the polymer was $\eta_2 = 520$ mPa-sec.

The flocculation indices were:
$KSD_1 = 13.7$ sec;
$KSD_2 = 19.8$ sec.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An aqueous dispersion of a water-soluble polymer comprising (A) a water soluble polymer and (B) a dispersant, wherein:

(A) is a water soluble polymer comprised of
   a1) 99-70 wt. %, of at least one water-soluble monomer,
   a2) 1-30 wt. %, of at least one hydrophobic monomer, and
   a3) 0-20 wt. %, of at least one amphipathic monomer, wherein the sum of the amounts of a1, a2 and a3 is 100 wt. %; and wherein the water-soluble polymer has a mean molecular weight $M_w$ (gravimetric mean) of at least $10^6$ Daltons formed by polymerization of monomer components (a1, a2, and a3) in the presence of (B) a polymeric dispersant D having a $M_w$ of from 10,000-500,000 Daltons.

2. The aqueous dispersion of claim 1; wherein at least one of said water soluble monomers has at least one ionic group.

3. The aqueous dispersion of claims 1 or 2; wherein the hydrophobic monomer is a compound of formula I:

$R_2$ represents a $C_{1-4}$ alkyl group, a $C_{5-12}$ cycloalkyl group, a $C_{6-12}$ aryl group, or

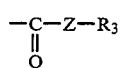

where $R_3$ represents a $C_{2-8}$ alkyl group, a $C_{5-12}$ cycloalkyl group, or a $C_{6-12}$ aryl group, and $Z$ represents O, NH, or $NR_3$.

4. The aqueous dispersion of claims 1 or 2; wherein said amphipathic monomer a3 is a compound of formula II:

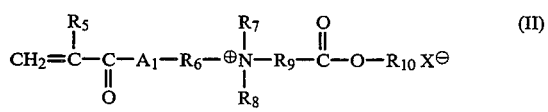

where $A_1$ represents O, NH, or $NR_4$, where $R_4$ represents a $C_{1-4}$ alkyl group;

$R_5$ represents hydrogen or methyl;

$R_6$ represents a $C_{1-6}$ alkylene group;

$R_7$ and $R_8$ each independently represent a $C_{1-6}$ alkyl group;

$R_9$ represents a $C_{1-6}$ alkylene group;

$R_{10}$ represents a $C_{8-32}$ alkyl, $C_{8-32}$ aryl, or $C_{8-32}$ aralkyl; and $X$ represents halogen, pseudohalogen, acetate, or $SO_4CH_3$.

5. The aqueous dispersion of claims 1 or 2; wherein said amphipathic monomer a3 is a compound of formula III:

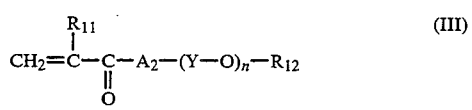

where $A_2$ represents O, NH, or $NR_{13}$, where $R_{13}$ represents a $C_{1-4}$ alkyl group;

$R_{11}$ represents hydrogen or methyl;

$R_{12}$ represents a $C_{8-32}$ alkyl, $C_{8-32}$ aryl, or $C_{8-32}$ aralkyl;

$Y$ represents a $C_{2-6}$ alkylene group; and $n$ is an integer between 1 and 50.

6. The aqueous dispersion of claims 1 or 2 wherein said dispersant D is a polyelectrolyte having a molecular weight $M_w$ of 10,000–500,000 Daltons.

7. The aqueous dispersion of claims 1 or 2 wherein said dispersant D is a polyalkylene ether wherein the alkylene groups have 2–6 C atoms.

8. The aqueous dispersion of claim 6, wherein said dispersant D has a $M_w$ of from 10,000–400,000 Daltons.

9. The aqueous dispersion of claim 1, wherein said polymeric dispersant D is incompatible with said water soluble polymer.

10. The aqueous dispersion of claim 1, wherein said water soluble polymer comprises 2–20 wt. % of said at least one amphipathic monomer.

11. The aqueous dispersion of claim 1, wherein said polymeric dispersant D is poly(diallyldimethylammonium chloride) with a $M_w$ between 50,000–400,000 Daltons.

* * * * *